US010242105B2

(12) United States Patent
Du et al.

(10) Patent No.: US 10,242,105 B2
(45) Date of Patent: Mar. 26, 2019

(54) COMMENT RANKING BY SEARCH ENGINE

(71) Applicant: Alibaba Group Holding Limited, Grand Cayman (KY)

(72) Inventors: Ranran Du, Beijing (CN); Yongbin Lin, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 219 days.

(21) Appl. No.: 14/308,580

(22) Filed: Jun. 18, 2014

(65) Prior Publication Data

US 2014/0379682 A1 Dec. 25, 2014

(30) Foreign Application Priority Data

Jun. 19, 2013 (CN) .......................... 2013 1 0242522

(51) Int. Cl.
*G06F 17/30* (2006.01)
*G06F 17/27* (2006.01)

(52) U.S. Cl.
CPC .. *G06F 17/30867* (2013.01); *G06F 17/30864* (2013.01); *G06F 17/30964* (2013.01); *G06F 17/2785* (2013.01); *G06F 17/3053* (2013.01); *G06F 17/30616* (2013.01)

(58) Field of Classification Search
CPC .............. G06Q 50/01; G06Q 30/0201; G06Q 30/0278; G06F 17/2785; G06F 17/30616; G06F 17/274; G06F 17/3053; G06F 17/30719; G06F 17/30731
USPC ....... 707/748, 706, 722, 723, 730, 737, 738, 707/752, 758, 794
See application file for complete search history.

(56) References Cited

U.S. PATENT DOCUMENTS

| 7,389,289 B2 * | 6/2008 | Solaro ............... G06F 17/30864 707/711 |
| 8,417,713 B1 * | 4/2013 | Blair-Goldensohn ....................... G06F 17/30867 705/347 |
| 8,645,395 B2 * | 2/2014 | Mushtaq ................. G06F 17/30 705/1.1 |

(Continued)

FOREIGN PATENT DOCUMENTS

| JP | 2008097286 A | 4/2008 |
| JP | 2008234090 A | 10/2008 |
| WO | WO2011019295 A1 | 2/2011 |

OTHER PUBLICATIONS

PCT Search Report and Written Opinion dated Jan. 19, 2016 for PCT Application No. PCT/US14/43032, 9 pages.

(Continued)

*Primary Examiner* — Dangelino N Gortayo
(74) *Attorney, Agent, or Firm* — Lee & Hayes, P.C.

(57) ABSTRACT

The present disclosure provides example methods and apparatuses for implementing comment ranking by a search engine. One or more terms describing a target object are extracted from a comment in connection with the target object. One or more useful attributes included in the comment are obtained according to the terms describing the target object. An scoring index the comment is determined according to a number of the useful attributes. The comment is scored according to the index. The comment is ranked according to the score. The present techniques enable a user to quickly and efficiently view helpful comments and help the user make an informed decision.

20 Claims, 4 Drawing Sheets

(56) References Cited

U.S. PATENT DOCUMENTS

| | | | | |
|---|---|---|---|---|
| 8,655,938 B1* | 2/2014 | Smith | ............... | G06F 17/3053 706/45 |
| 8,671,098 B2* | 3/2014 | Salvetti | ............ | G06Q 30/0278 707/738 |
| 8,700,480 B1* | 4/2014 | Fox | ................... | G06Q 30/0278 705/26.1 |
| 8,725,495 B2* | 5/2014 | Peng | .................... | G06F 17/274 704/1 |
| 8,744,855 B1* | 6/2014 | Rausch | ................. | G06F 17/27 235/375 |
| 8,799,773 B2* | 8/2014 | Reis | ...................... | G06N 5/025 704/9 |
| 8,918,312 B1* | 12/2014 | Rehling | ............. | G06F 17/2785 704/9 |
| 8,949,211 B2* | 2/2015 | Lu | ........................ | G06O 30/02 707/705 |
| 8,983,975 B2* | 3/2015 | Kenton | ................. | G06Q 30/00 706/12 |
| 9,129,008 B1* | 9/2015 | Kuznetsov | ....... | G06F 17/30038 |
| 9,135,665 B2* | 9/2015 | England | ............ | G06Q 30/0282 |
| 9,342,846 B2* | 5/2016 | Maddali | ............ | G06Q 30/0282 |
| 2005/0193335 A1* | 9/2005 | Dorai | ................ | G06F 17/30893 715/234 |
| 2007/0038646 A1 | 2/2007 | Thota | | |
| 2007/0067294 A1* | 3/2007 | Ward | ................ | G06F 17/30867 707/999.007 |
| 2007/0156672 A1 | 7/2007 | Wolff et al. | | |
| 2008/0040383 A1 | 2/2008 | Kuwata et al. | | |
| 2009/0311658 A1 | 12/2009 | Polivka | | |
| 2010/0262597 A1* | 10/2010 | Han | ................ | G06F 17/30616 707/723 |
| 2011/0082848 A1 | 4/2011 | Goldentouch | | |
| 2011/0258556 A1 | 10/2011 | Kiciman et al. | | |
| 2012/0143597 A1 | 6/2012 | Mushtaq et al. | | |
| 2012/0259866 A1 | 10/2012 | Austin et al. | | |
| 2012/0278767 A1 | 11/2012 | Stibel et al. | | |
| 2013/0073545 A1 | 3/2013 | Jain | | |
| 2013/0151236 A1* | 6/2013 | Iofinov | ............. | G06F 17/30327 704/9 |
| 2013/0159413 A1* | 6/2013 | Davis | ................. | H04L 29/0872 709/204 |
| 2015/0052098 A1* | 2/2015 | Kveton | ............ | G06F 17/30731 706/52 |

OTHER PUBLICATIONS

The European Office Action dated Apr. 24, 2018 for European Patent Application No. 14742007.9, a counterpart foreign application of U.S. Appl. No. 14/308,580, 6 pages.

The Chinese Office Action dated Dec. 27, 2016 for Chinese patent application No. 201310242522.8. a counterpart foreign application of U.S. Appl. No. 14/308,580, 8 pages.

The Chinese Office Action dated Aug. 10, 2017 for Chinese patent application No. 201310242522.8. a counterpart foreign application of U.S. Appl. No. 14/308,580, 9 pages.

The Extended European Search Report dated Feb. 9, 2017 for European Patent Application 14742007.9, 7 pages.

The Japanese Office Action dated Jun. 19, 2018, for Japanese patent application No. 2016-521555, a counterpart foreign application of U.S. Appl. No. 14/308,580, 6 pages.

Tanimoto et. al., "Evaluation of Evaluative Expression Dictionaries for Visualizing Reputation," Proceedings of the 3rd Forum on Data Engineering and Information Management [online], The Institute of Electronics, Information and Communication Engineers, Data Engineering Technical Committee, Aug. 4, 2011, Retrieved from: Internet <URL: http://dbevent.jpn.org/deim2011/proceedings/pdf/f2-6.pdf> 9 pages.

* cited by examiner

COMMENT RANKING BY SEARCH ENGINE

CROSS REFERENCE TO RELATED PATENT APPLICATIONS

This application claims foreign priority to Chinese Patent Application No. 201310242522.8 filed on 19 Jun. 2013, entitled "Method and Apparatus for Implementing Comment Ranking by Search Engine," which is hereby incorporated by reference in its entirety.

TECHNICAL FIELD

The present disclosure is related to the field of the Internet, and more particularly to a method and an apparatus of implementing comment ranking by a search engine.

BACKGROUND

With the development of the Internet in the world, there are more and more people accepting the Internet and relying on the Internet for their work and daily lives. Activities previously requiring face to face interaction are gradually being replaced by the Internet.

The development of the Internet has generated a variety of applications, one of which is electronic commerce, i.e., e-commerce.

E-commerce utilizes computer technology, network technology, and remote communicating technology to achieve electronics, digitalization, and networking for the entire transaction process. The term e-commerce is usually referred to as a novel business model by which worldwide commercial and trade activities are transacted in an open network environment such as the Internet. In e-commerce, various commercial and trade activities, such as on-line shopping by a consumer, on-line transactions between merchants, on-line payment as well as all kinds of business activities, trade activities, financial activities and related activities of integrated services are conducted based on the application of browsers/servers, where a face to face meeting between a buyer and a seller is not required.

With the development of e-commerce, there are more and more consumers, i.e., users, choosing to purchase various products and services such as clothes, digital products, home appliances, books and lottery tickets online. However, it is not easy for a user to choose the most satisfying item from a wide range of products and services on the Internet, especially when the transaction is made when the user cannot see the physical object or is unfamiliar with the merchant.

There are a lot of websites that provide information related to products and services to help the user make a decision, among which the most convenient and effective one is offering the comments provided by other users with respect to these products or services. Accordingly, the user can make his/her decision based on a massive amount of comments about the product or the service from a massive amount of other users.

A comment search engine based on user comments is a key solution for resolving this issue. When the user clicks a product or a product attribute on a webpage, the comment search engine will perform a search in an index file according to a keyword, and return the most relevant comment information.

However, as a number of comments with respect to the desired product or the desired service may be large, the user may not have sufficient time or energy to read through all the comments. Thus, how the user can rapidly and efficiently retrieve a helpful comment that facilitates decision making has become a problem.

In addition, such commenting platforms are open to the users. In other words, the contents of the comments are not restricted. Consequently, a lot of spam contents such as advertisements, contents irrelevant to the product, or contents with very little useful information may be contained in the growing massive amount of comments with respect to the product. Thus, how to help the user to effectively eliminate or ignore the comments containing spam contents has also become an issue.

The conventional techniques solve these issues by ranking the comments in accordance with time. Specifically, the most recent comment is displayed at the top, and the earlier comment is displayed at the bottom. In this way, the most recent comment can be read by the user in his first priority, and the comments that are published earlier will be read in a low priority as the user scrolls down the page or flips the page.

However, users usually become impatient in the operation of flipping the list of pages during the browsing process. Prior experiences show that users often start to leave the page when the users begin to browse the third page, and a proportion of users leaving the page become higher as the number of pages browsed increases.

Therefore, an excellent content published earlier that is helpful to the user's decision making may be unread by the user. Accordingly, the conventional sorting method that only considers a sequence of publishing time cannot help the user to quickly reach high quality content, and is not helpful for reducing the time of decision making for the user.

Moreover, sometimes the user may not want to browse each comment one by one, but rather wants to focus on reading comments with respect to a specific attribute or a specific aspect of the product or the service. Such a demand may be satisfied by performing an emotional analysis of the comments.

The emotional analysis of the comment is referred to performing a structural analysis with respect to the content of the comment so as to obtain a description of the overall product and attributes in each dimension expressed by the users through their comments.

Therefore, the present techniques efficiently provide good quality and useful comment contents to the user and reduce a number of pages that the user flips.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present techniques improve diversity of results in the direction technology.

The present disclosure provides a method and an apparatus for implementing comment ranking by a search engine.

The present disclosure provides an example method for ranking comments by the search engine. One or more terms describing a target object are extracted from a comment in connection with the target object. One or more useful attributes included in the comment are obtained according to the terms describing the target object. One or more scoring indexes to score the comment are determined according to a number of the useful attributes. The comment is scored according to the scoring indexes. The comment is ranked according to the score.

The present disclosure also provides an example apparatus for ranking comments by the search engine. An extracting module extracts one or more terms describing a target object from a comment in connection with the target object. An obtaining module obtains one or more useful attributes included in the comment according to the terms describing the target object. A determining module determines one or more scoring indexes to score the comment according to a number of the useful attributes. A scoring module scores the comment according to the indexes. A ranking module ranks the comment according to the score.

Compared with the conventional techniques, the present techniques enable the users to read helpful comment information quickly and effectively. The users are able to understand the product, service, and the merchant better and thus make a better shopping decision. The present techniques not only reduce a number of pages that the users flip when the users browse the comments and improve the efficiency in on-line shopping but also help a website to effectively manage the comments of its products and services.

BRIEF DESCRIPTION OF THE DRAWINGS

The FIGs are used to provide illustration of the present disclosure and thus are part of the present disclosure. The illustrative examples and their explanations are used to illustrate the present disclosure and should not be used to limit the present disclosure. In the FIGs, the same reference numerals refer to the same or similar parts.

DETAILED DESCRIPTION

Figure 1:
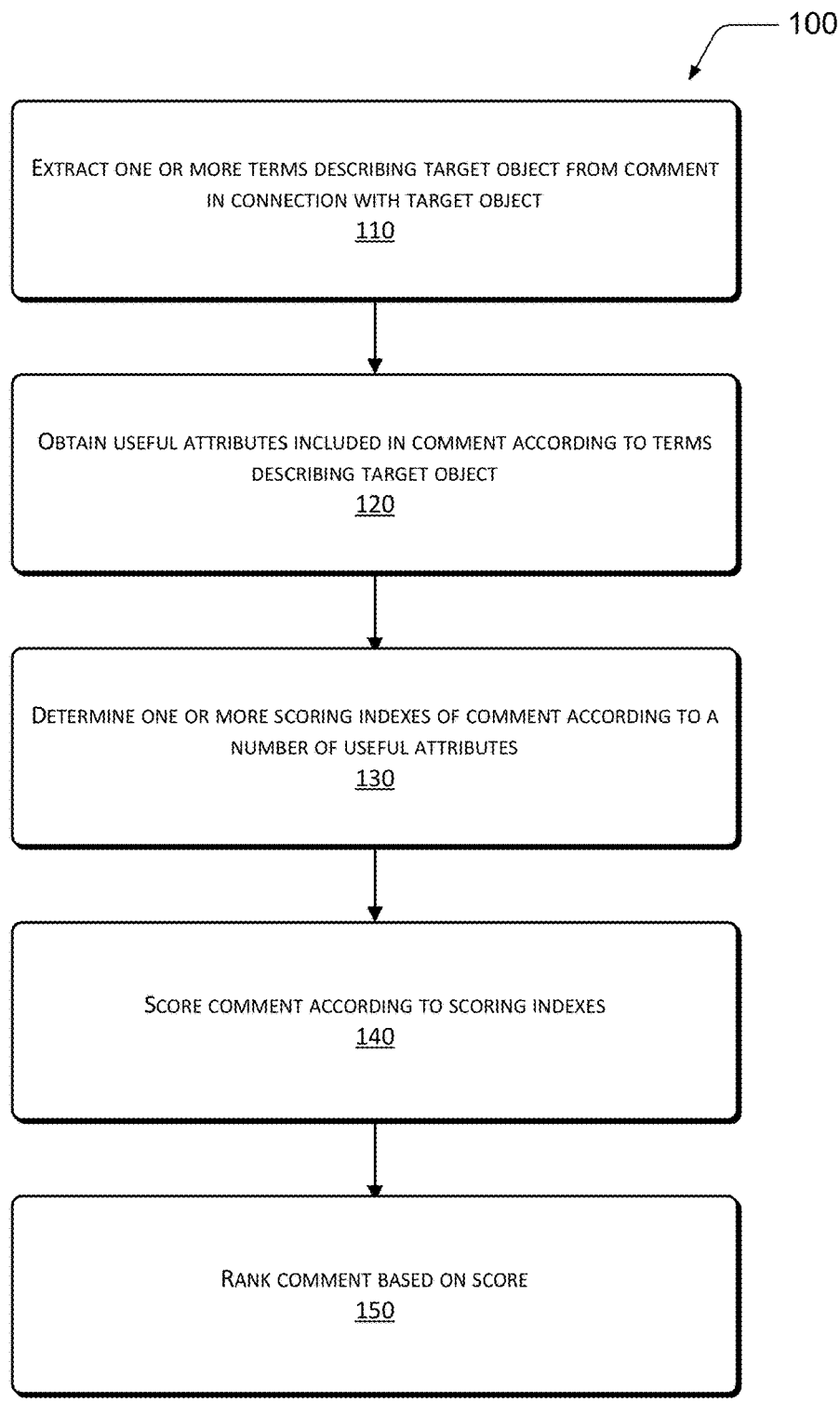
FIG. 1 is a flowchart illustrating an example method for implementing comment ranking.

Conventional techniques, when ranking a comment (or "points of view"), do not consider the following factors: an amount of useful product attributes in the comment, i.e., useful information in the comment, a readability of a sentence as the sentence that is too long or redundant is inconvenient for a user to obtain useful information, an amount of useless attributes in the comment such as an attribute of logistics or an attribute of advertisement, and a field of the product attribute as the useful attributes are different for different products such that standby time is a very important product attribute to mobile phones but is meaningless for products such as lotions.

The present techniques, when ranking a comment, take into account the amount of useful information in the comment based on an emotional analysis. The amount of useful information in the comment based on the emotional analysis is obtained by segmenting the comment to an attribute granularity level through the emotional analysis, obtaining evaluation of the useful attributes in the comment, and calculating the amount of information that evaluates the useful attributes, i.e., the amount of useful information in the comment.

For example, in a comment relating to a specific lotion, a sentence "buying it for a classmate" does not provide any evaluation of the product and thus is useless. In contrast, another sentence that "this lotion provides good moisturizing effects" provides an evaluation of a useful attribute about the moisturizing effect of the product, and thus is useful information to users.

Thus, the information that really affects a user's understanding of a target object, i.e., useful information in the comment, may be given more weight during the process of ranking comments. When the useful information is included in the consideration, the displaying order of the comments can be sorted in a way so that contents having more useful information can be shown at a higher priority position. Accordingly, the number of pages that a user needs to check for the comments may be reduced. The present techniques not only save the user's time and effort but also enable the website to manage and use the comments more effectively.

In an example implementation of the present techniques, a computing device includes one or more processors or central processing units (CPUs), input/output interfaces, network interfaces, and memories.

The memory may include non-permanent memory, random access memory (RAM) and/or nonvolatile memory, e.g., read-only memory (ROM) or flash memory (flash RAM) as used in a computer readable medium. The memory can be regarded as an example of a computer readable medium.

The computer readable medium includes permanent and non-permanent as well as removable and non-removable media capable of accomplishing a purpose of information storage by any method or technique. The term of information may be referred to as computer executable instructions, a data structure, a program module or any kind of data. Examples of the computer readable medium or the computer storage medium may include, but are not limited to, phase-change memory (PRAM), static random-access memory (SRAM), dynamic random access memory (DRAM), other types of random access memory (RAM), read-only memory (ROM), electrically-erasable programmable read-only memory (EEPROM), flash memory or any other memory technologies, compact disc read-only memory (CD-ROM), digital versatile disk (DVD) or any other optical storage media, cassette tape, diskette or any other magnetic storage device, or any other non-transmission medium which can be used to store information and accessed by the computing device. As defined herein, the computer readable medium does not include transitory medium such as a modulated data signal and a carrier wave.

The detailed descriptions of the present disclosure are provided below with the example embodiments and accompanying drawings in order to make the objectives, technical solutions and advantages of the present disclosure more clear.

In the following descriptions, a use of "an example embodiment," "the example embodiment," "an example," "the example," etc., may indicate that a specific feature, structure, characteristic, property, element, or limit is included in the specific example embodiment or example. Nevertheless, it is not necessary that each embodiment or example needs to include such specific feature, structure, characteristic, property, element or limit. In addition, although the phrase "in an example embodiment" is repeatedly used, which may refer to the same embodiment, it does not necessarily need to refer to the same embodiment.

In the following description, some technical features known to one of ordinary skill in the art are omitted for simplicity.

FIG. 1 is a flowchart illustrating an example method 100 that implements ranking comments at a search engine according to an example embodiment of the present disclosure.

At 110, one or more terms describing a target object are extracted from a comment in connection with the target object. The term "object" refers to the object in connection with the comment.

For example, a user may provide comments with respect to a specific product or a service in an application of e-commerce. Hence, the target object in the example is the specific product or service. Sometimes the user may provide comments with respect to different merchants for other users' reference. In this case, the object is the merchant itself. For another example, the user may provide comments with respect to different restaurants at a specific evaluation website. In this case, the object of the comment is the different restaurants.

For another example, the user may provide comments with respect to a specific news article on a specific news website. In this case, the object is the news article.

For another example, the user may provide comments with respect to a status of his/her friend, another user, or a content posted by the friend on a social network. In this case, the object is the status of his/her friend, another user, or the content posted by the friend on the social network.

It should be noted that the examples of objects described above are merely illustrative rather than restrictive. A person of ordinary skill in the art may easily find other embodiments of the term "object" according to the present disclosure.

In the present disclosure, a term used by the users to describe the target object, e.g., a product, a service or a merchant in the comments, may be referred to as an emotional term.

Then, a search can be performed according to the terms obtained from the operation of word segmentation in a list containing emotional terms, also known as "an emotional term dictionary", which is maintained on a server side, to determine the emotional terms included in the comments.

At 120, one or more useful attributes included in the comment are obtained according to the terms describing the target object.

The term "useful attribute" as used herein, for example, describes an attribute which most users are concerned about with respect to the target object such as a product. The useful attributes vary with respect to different types of objects. For example, the useful attributes vary with respect to the products that belong to different fields or categories. In the case of a product such as a mobile phone, the useful attributes may include a standby time, a screen, functionality, etc. In the case of a different product such as a lotion, the useful attributes may include a moisturizing effect, a whitening effect, and a nourishing effect.

According to an example embodiment of the present disclosure, the useful attributes of the target object may be obtained by using a data mining technology to extract them from the existing massive amount of comments with respect to the target object.

According to another example embodiment of the present disclosure, the useful attributes may be preset.

A useful attribute is an aspect (or a characteristic) of the target object, e.g., a product, a service, or a merchant, etc.

An emotional term refers to as a thought or a point of view expressed by the user in the comment about the target object. For example, with respect to a useful attribute "nourishing effect," the emotional terms in the user's comments may be words such as "nourishing," "dry," "great," etc.

For example, under the category of the lotion, the useful attributes may include an overall product, a nourishing effect, an irritant, etc. Accordingly, for example, a corresponding relationships between normalized useful attributes, the useful attributes, normalize emotional terms, and the emotional terms may be shown in Table 1:

TABLE 1

| Examples of normalized useful attributes | Examples of useful attributes | Examples of normalized emotional terms | Examples of emotional terms |
| --- | --- | --- | --- |
| Overall product | overall product, generally speaking, overall, . . . | good, bad, fair | like, dislike, good, . . . |
| Price | money, sale price, dollar amount, . . . | high, low, fair | high, low, expensive, cheap, . . . |
| Nourishing effect | skin nourishing capacity, moisture-retaining capacity, moisturizing effect, . . . | good, not good, fair | nourishing, dry, . . . |
| Scent | smell, smell like, fragrance, . . . | light, strong, normal | light, strong, . . . |
| Irritant | irritant level, . . . | mild, irritating, normal, | mild, irritating, . . . |

For example, an operation of word segmentation may be applied to the users' comments first. The operation of word segmentation divides a sentence into different terms. There are various methods for word segmentation, such as a Forward Maximum Matching Method, a Backward Maximum Matching method, and a Bidirectional Maximum Matching method.

Figure 3:
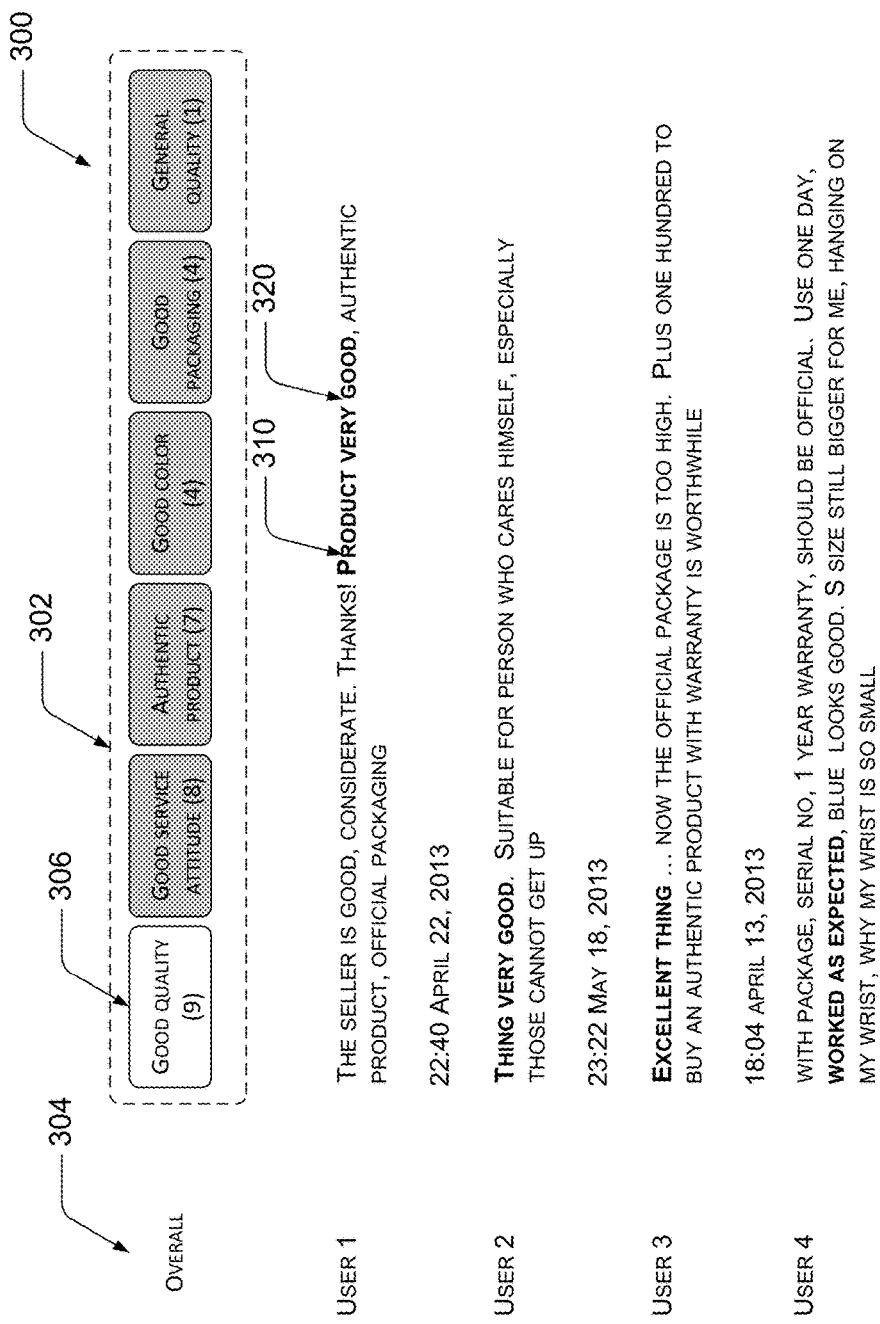
FIG. 3 is an example display at a webpage according to an example embodiment of the present disclosure.

The relationship between the normalized useful attributes and the useful attributes as well as the relationship between the normalized emotional terms and emotional terms may refer to the following FIG. 3 and the descriptions thereof.

For example, the user's comments in connection with a specific lotion is "generally speaking, I quite like this lotion. It's nourishing with a light smell, and it's mild." In the comment, "quite like" is the emotional term, "generally speaking" is a useful attribute which is corresponded to a normalized useful attribute of "overall product," "nourishing" is the emotional term whose corresponding term of useful attribute does not appear in the comment and whose corresponding normalized useful attribute is "nourishing effect." Therefore, sometimes emotional terms appear in the comment without directly accompanying corresponding terms of useful attributes.

In a general situation, a corresponding useful attribute may be obtained directly from the emotional term.

In some circumstances, obtaining a corresponding useful attribute directly from the emotional term is not possible. For example, the user's comment includes "the money and the quantity are both reasonable," wherein the emotional term is "reasonable," and determining a corresponding useful attribute therefrom is not possible. At this point, a search with respect to the corresponding useful attribute of the emotional term may be performed in the comment. One useful attributed is obtained as "money" and its corresponding normalized useful attribute is obtained as "price." Another useful attribute is obtained as "quantity" and a corresponding normalized useful attribute is obtained as "quantity."

In another circumstance, the useful attribute may not be obtained from the emotional term and the corresponding useful attributes may not be found out in the comments. In other words, there is no objectively corresponding useful attributes of such emotional term. For example, an emotional term "sharp" is found in the user's comments with respect to the lotion. Such an emotional term does not have a corresponding useful attribute. In this case, the emotional term is ignored without performing further analysis.

According to an example embodiment of the present disclosure, a table recording the corresponding relationship between at least two of the normalized useful attribute, the useful attribute, the normalized emotional term, and the emotional term may be maintained at a database at a server side to be searched during the process of ranking the comments.

At 130, one or more scoring indexes that score the comment are determined according to a number of the useful attributes.

Figure 2:
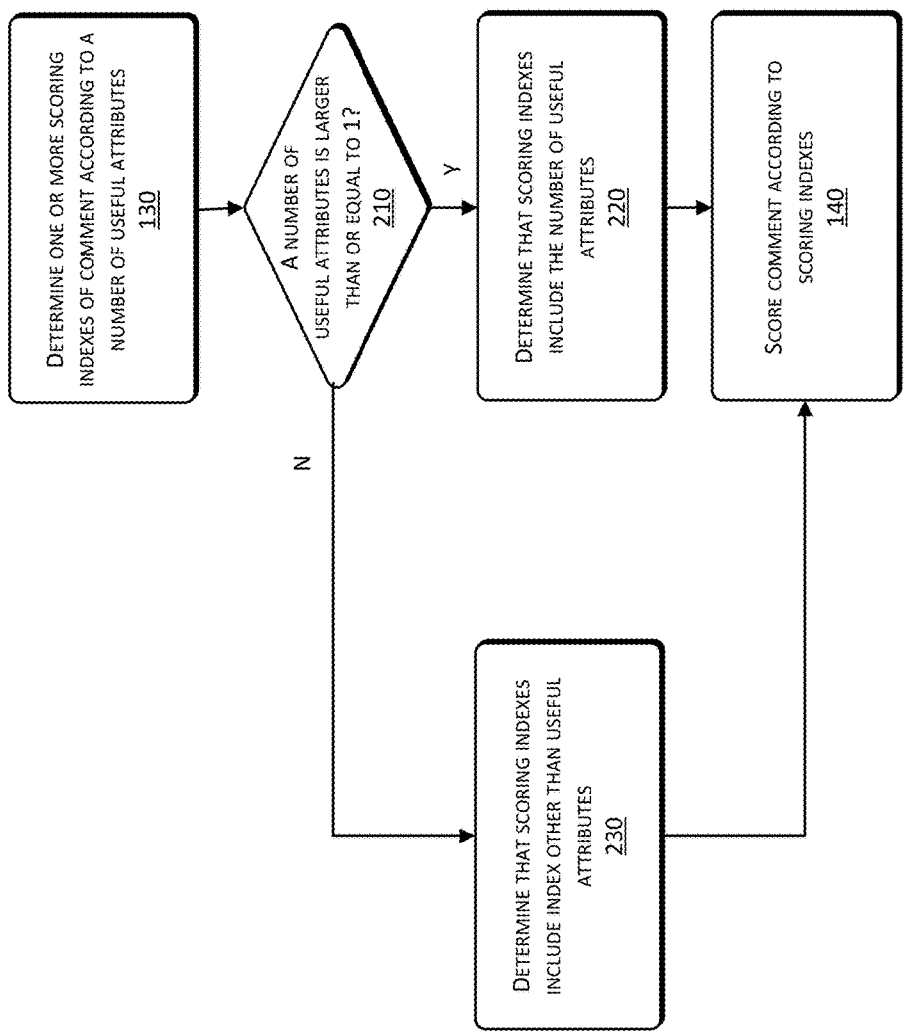
FIG. 2 is a flowchart illustrating an example detailed operation in FIG. 1.

FIG. 2 is a more detailed flowchart illustrating the operations at 130 in FIG. 1. At 210, the present techniques determine whether the number of the useful attributes in the comment is larger than or equal to 1.

If the number of the useful attributes in the comment is larger than or equal to 1, operations at 220 are performed. At 220, the present techniques determine that the scoring indexes include the number of the useful attributes.

An example formula for calculating the number of useful attributes included in the comment is as follows:

$$SD = \gamma \qquad (1)$$

In the formula, $\gamma$ represents the number of the useful attributes obtained from the operations at 110.

According to an example embodiment of the present disclosure, when the scoring indexes includes the number of the useful attributes, the scoring indexes may further include at least one of the items: a readability of the comment, a useless attribute in the comment, and a commenting time.

The readability of the comment refers to an index of whether the comment is easy to read for the users. Normally, a sentence that is too long, a sentence with an overly short clause, or a sentence with too many clauses is considered as difficult to read for the users. Consequently, the readability is low. According to an example embodiment of the present disclosure, an example formula for calculating the comment readability is as follows:

$$NL = \sum_0^{num} e^{\frac{|length - \alpha|}{\beta}} \qquad (2)$$

In the formula, the symbol NL represents a normalized length of all of the clauses in the user's comment, and a length represents a number of characters in a specific clause of the user's comment. A clause is a part of a sentence that is separated by a punctuation mark. In an example embodiment of the present disclosure, a number of one Chinese character is 1, and a number of one English alphabet is also 1, e.g., a length of a term "my" is 2. In the formula, $\alpha$ represents a reasonable average value with respect to a readable sentence for ordinary people, and $\beta$ represents a reasonable variance with respect to the readable sentence for ordinary people. Both $\alpha$ and $\beta$ are constants. The formula (2) uses the normalized length of the user's comment to describe the readability of the sentence.

The useless attribute of the comment refers to an attribute that lowers the score in relation to the ranking of the comment.

According to an example embodiment of the present disclosure, the useless attribute may be predetermined and applicable to all categories, or set based on experiences or practical applications.

For example, while the useful attributes may be used for analysis purpose and displayed to the user, the useless attributes are only used for ranking. The user may click the useful attributes on a webpage so that the comments are sorted in an order according to the useful attributes.

According to an example embodiment of the present disclosure, when the comment includes the useful attributes, an example formula for calculating the ranking factor for the useless attributes of the comment is as follows:

$$FS = \frac{\delta}{1 + e^{\varepsilon + \epsilon}} \qquad (3)$$

In the formula, the symbol FS represents a ranking factor for the useless attributes, $\varepsilon$ represents a number of useless attributes included in the comment, and $\delta$ and $\epsilon$ are constants. The constants $\delta$ and $\epsilon$ have constant values, and each is determined through multiple experiments so that the larger the $\varepsilon$ value is, the smaller the score of formula (5) below becomes. The useless attributes may also be defined manually according to different ranking requirements. For example, most of the attributes displayed on some instant messaging tools are advertising attributes, which can be considered as useless attributes. In the case where an application does not desire too much logistical information, the attributes such as the speed of the logistic service or the service attitude of the logistic service are considered as the useless attributes. The useless attributes may be universal to all products, which are used to calculate the score of ranking and are not used for displaying the attribute tags to the user.

When the number of the useful attributes in the comment is 0, operations at 230 are performed. At 230, the scoring indexes are determined to include an index other than the useful attributes. According to an example embodiment of the present disclosure, the scoring indexes other than the index of useful attributes may includes at least one of the following items: the readability of the comment, the ranking factors for useless attributes in the comment, and the commenting time.

The useless attribute of the comment refers to an attribute that lowers the score of ranking for the comment. According to an example embodiment of the present disclosure, when the comment does not include useful attributes, an example formula for calculating the ranking factor for the useless attribute of the comment is as follows:

$$FSN = \frac{\delta}{1 + e^{-\varepsilon * \epsilon}} \quad (4)$$

In the formula, the symbol FSN represents the ranking factor for the useless attributes, $\varepsilon$ represents a number of useless attributes included in the comment, and $\delta$ and $\varepsilon$ are constants. The constants $\delta$ and $\varepsilon$ are constant values, and each is determined through multiple experiments so that the larger the $\varepsilon$ value is, the smaller the score of formula (6) below becomes.

At 140, the comment is scored according to the scoring indexes. In the scoring, scoring indexes such as the number of the useful attributes, the readability of the sentence, and the useless attributes of the sentence, may be considered in the step of scoring.

According to an example embodiment of the present disclosure, when the comment contains useful attributes and the scoring indexes include the number of useful attributes, the readability of the comment, and the ranking factors for useless attributes in the comment, an example formula for calculating the score of final ranking is as follows:

$$score = SD/NL * FS \quad (5)$$

In the formula, the symbol SD represents the number of the useful attributes, the symbol NL represents the normalized length of all clauses in the user's comment, and the symbol FS represents the ranking factor for the useless attributes which is calculated according to the formula (3).

According to another example embodiment of the present disclosure, the comment does not include the useful attributes and the scoring indexes include one or more scoring indexes other than the useful attributes. The scoring indexes other than the useful attributes may include: the readability of the comment and the ranking factor for useless attributes in the comment. In this case, an example formula for calculating the score of final ranking is as follows:

$$score = -NL * FSN * \frac{1}{num^\theta} \quad (6)$$

In the formula, the symbol "num" represents a number of the clauses, and $\theta$ is a constant which is determined by multiple experiments so that a ranking result may mostly meet an expectation. The symbol score represents the ranking score. The symbol NL represents the normalized length of all clauses in the comment which is calculated according to the formula (2) and the symbol FSN represents the ranking factor for the useless attributes which is calculated according to the formula (4). As shown in the formula (4), there will be more negative impacts to the comment or the score of the corresponding comment becomes lower when the number of the useless attribute is higher.

According to an example embodiment of the present disclosure, the commenting time may be considered as a factor during the operation of calculating the final ranking score. For example, the commenting time may be normalized and then used in calculating the final ranking score.

When a specific comment has a higher score, it indicates that the comment has more useful information that helps the user to make a decision, such as a shopping decision.

At 150, the comment is ranked based on the score. According to one example embodiment of the present disclosure, the comments are displayed in a descending order of scores from high to low.

FIG. 3 shows an example webpage display according to an example embodiment of the present disclosure.

At a displaying webpage 300, multiple displaying tags 302 are shown at a top portion of the webpage 300, and a list of comments is displayed below the displaying tag 302. When a button "all" 304 at the left of the displaying tag 302 is clicked by the user, all of the comments are displayed in a sorted order according to the present techniques. When one of the displaying tags 302 is clicked by the user, the comments corresponding to the corresponding displaying tag are displayed in an order sorted according to the present techniques.

In FIG. 3, for example, when the user clicks a displaying tag "good quality" 306 as a result, the comments corresponding to the displaying tag "good quality" 306 are displayed in an order ranked by the methods of the present disclosure. For example, the corresponding comments usually include a combination of a useful attribute 310 such as "product" and an emotional term 320 such as "very good".

It is noted that specific terms of the useful attribute 310 included in the comments are not necessary the same. For example, with respect to a useful attribute of product quality, one user may refer to it as "a product," another user may refer to it as "a thing," and another user may not even mention the product directly, etc.

Moreover, the emotional terms or descriptions used by the users may not necessarily be the same even if the same or similar emotional attitudes are expressed. For example, one user may use the term "very good," another user may use the term "excellent," and another user may user the term "worked as expected," etc.

Therefore, although the meaning of combination of the useful attribute 310 and the emotional term 320 found in the comments may be the same or similar, the expressions may not necessarily be the same. As shown in FIG. 3, with respect to the useful attribute, such as product quality, the specific user comments may be "product very good", "thing very good," "excellent thing," "worked as expected," etc. According to an example embodiment of the present disclosure, such combinations of useful attributes and emotional terms with different specific expressions but substantially same or similar meaning may be normalized to be displayed to the user as shown in FIG. 3.

Such purpose may be fulfilled by the displaying tags 302. The displaying tags 302 may include two parts. One part is the normalized useful attribute, and the other part is the normalized emotional term. For example, the displaying tag "good quality" 306 as shown in the FIG. 3 includes two parts, i.e., "quality" and "good," in which "quality" is the normalized useful attribute and "good" is the normalized emotional term. Accordingly, the displaying tags 302 are results displayed to the user that are obtained from normalizing the combination of the useful attributes and the emotional terms.

According to an example embodiment of the present disclosure, the user may click one of the displaying tags 302 on the webpage to view the comments corresponding to the particular displaying tag. The comments are displayed in an order sorted or ranked by the method of the present disclosure.

According to another example embodiment of the present disclosure, portions corresponding to a displaying tag may be highlighted in the list of comments for display.

Thus, the present techniques not only rank the comments in consideration of the useful attributes of the target object but also display the ranked results according to different displaying tags, which further help the user to make a fast shopping decision.

It should be noted that the displaying tags as shown in FIG. 3 are merely illustrative rather than restrictive. A person of ordinary skill in the art may design different displaying tags according to specific application based on the descriptions of the present disclosure.

Figure 4:
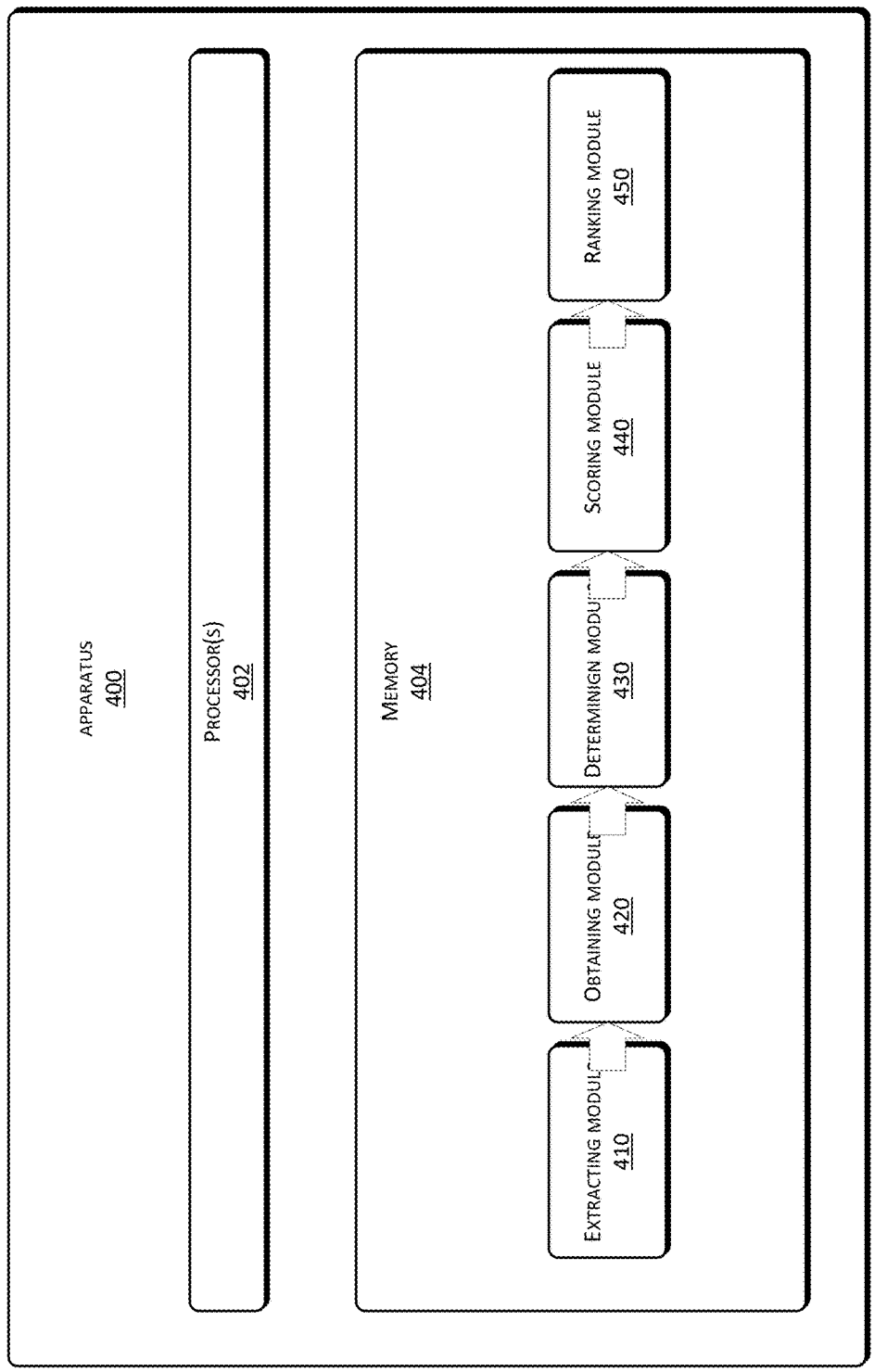
FIG. 4 is a schematic diagram illustrating an example apparatus for implementing comment ranking in accordance with an example embodiment of the present disclosure.

FIG. 4 is a diagram illustrating an example apparatus 400, such as a computing device, that implements ranking the comments by a search engine according to one example embodiment of the present disclosure.

The apparatus 400 may include one or more processors or data processing units 402 and memory 404. The memory 404 may store therein a plurality of modules including an extracting module 410, an obtaining module 420, a determining module 430, a scoring module 440, and a ranking module 450. The extracting module 410 extracts one or more terms describing a target object from a comment in connection with the target object. The obtaining module 420 obtains one or more useful attributes included in the comment according to the terms describing the target object. The determining module 430 determines one or more scoring indexes that score the comment according to a number of the useful attributes. The scoring module 440 scores the comment according to the scoring indexes. The ranking module 450 ranks the comment according to the score.

According to an example embodiment of the present disclosure, the determining module 430 may further include a first determining sub-module that determines that the scoring indexes that score the comments includes the number of the useful attributes in the comments, when the number of the useful attributes is larger than or equal to 1.

According to one example embodiment of the present disclosure, the scoring indexes that score the comments may further include at least one of the items: a readability of the comment, a ranking factor of the useless attributes in the comments, and a commenting time.

According to an example embodiment of the present disclosure, the determining module 430 may further include a second determining sub-module that determines that the scoring indexes that score the comments includes one or more scoring indexes other than the useful attributes in the comments, when the number of the useful attributes is 0.

According to an example embodiment of the present disclosure, the scoring indexes other than the useful attributes may include at least one of the items: the readability of the comment, the ranking factor of the useless attributes in the comments, and the commenting time.

According to an example embodiment of the present disclosure, the apparatus 400 may further include a displaying module that displays one or more displaying tags to the user. The display tag may include the normalized useful attribute and the normalized term that describes the target object. The displaying tag may be clicked by the user and a sorted list of the user comments corresponding to the displaying tag is thereby displayed.

According to one example embodiment of the present disclosure, the target object may be a product, a service, or a merchant.

The present techniques may be typically applicable to e-commerce activities. However, the present techniques are not limited to such use and may be implemented in other Internet uses, such as a news website, a social network, etc., as long as any application that contains the comments of a specific matter or phenomenon, i.e. the target object. A person with ordinary skill in the art may readily think of other Internet applications of the present disclosure.

A person of ordinary skill in the art should understand that the embodiment of the present disclosure may be provided as a method, a system, or a product of computer program. Therefore, the present techniques may be implemented in a form of hardware, software, or a combination of hardware and software. In addition, the present disclosure may be implemented as the product of computer program that stored on a computer readable storage medium, which includes but not limit to: a disk memory, a CD-ROM or an optical memory, including computer executable instruction.

The embodiments described above are only example embodiments of the present disclosure, and are not intended to limit the scope of the present disclosure. Various modifications and alternations may be made to the present disclosure by a person with ordinary skill in the art. Any modifications, replacements and improvements that fall within the spirit and the principle of the present disclosure shall be included in the claim scope of the present disclosure.

What is claimed is:

1. A method, the method performed by a server, the server comprising one or more processors and a memory device communicatively coupled with the one or more processors, the memory device including instructions, which when executed cause the one or processors to perform acts comprising:

extracting one or more terms describing a target object from a comment with respect to the target object;

identifying one or more emotional terms in the one or more terms describing the target from a list of emotional terms maintained at the server;

determining one or more scoring indexes to score the comment according to a number of useful attributes in the comment based on the one or more emotional terms, the one or more scoring indexes including readability of the comment and a ranking factor of one or more useless attributes in the comments, the readability of the comment determined based on a normalized length of clauses that is calculated based on associated lengths of all of clauses in the comment;

scoring the comment according to the one or more scoring indexes; and ranking the comment according to a result of the scoring.

2. The method of claim 1, wherein the extracting the one or more terms describing the target object from the comment in connection with the target object comprises conducting a word segmentation of the comment, and wherein identifying one or more emotional terms in the one or more terms describing the target from a list of emotional terms maintained at the server comprises:

finding one or more emotional terms from a result of the word segmentation, a respective emotional term being a term reflecting a view of a user to a respective useful attribute of the target object, a respective useful attribute being information that describes an aspect or a characteristic of the target object, and identifying the found one or more emotional terms from the list of emotional terms maintained at the server.

3. The method of claim 2, further comprising finding the respective useful attribute corresponding to the respective emotional term.

4. The method of claim 2, further comprising searching the comment to find the respective useful attribute corresponding to the respective emotional term.

5. The method of claim 2, further comprising ignoring the respective emotional term in response to determining that the respective useful attribute corresponding to the respective emotional term is not found.

6. The method of claim 2, further comprising:
normalizing the number of useful attributes,
normalizing the one or more emotional terms; and
maintaining a corresponding relationship between at least two of:
the number of useful attributes;
the normalized number of useful attributes;
the one or more emotional terms; or
the normalized one or more emotional terms.

7. The method of claim 1, further comprising data-mining one or more other comments with respect to the target object to obtain the number of useful attributes.

8. The method of claim 1, further comprising presetting the number of useful attributes with respect to the target object.

9. The method of claim 1, wherein the number of useful attributes is different with respect to different target objects.

10. The method of claim 1, wherein the determining one or more scoring indexes to score the comment according to the number of useful attributes in the comment based on the one or more terms comprises:
when the number of the useful attributes is larger than or equal to 1, determining that the one or more scoring indexes include the number of the useful attributes in the comment.

11. The method of claim 10, wherein the one or more scoring indexes further include:
a commenting time.

12. The method of claim 1, wherein the determining one or more scoring indexes to score the comment according to the number of useful attributes in the comment based on the one or more terms comprises:
when the number of the useful attributes is 0, determining that the one or more scoring indexes include one or more indexes other than the one or more useful attributes.

13. The method of claim 12, wherein the one or more indexes other than the useful attributes include readability of the comment, a ranking factor of one or more useless attributes in the comments, and a commenting time.

14. The method of claim 1, further comprising displaying one or more displaying tags, at least one of the displaying tags including a normalized useful attribute and a normalized term describing the target object.

15. The method of claim 14, further comprising displaying a list of ranked comments corresponding to a respective displaying tag that is selected by a user.

16. An apparatus comprising:
one or more processors; and
a memory device including instructions executable by the one or more processors which when executed perform acts comprising:
extracting one or more terms describing a target object from a comment with respect to the target object;
identifying one or more emotional terms in the one or more terms describing the target from a list of emotional terms maintained at the server;
obtaining a number of useful attributes in the comment based on the one or more emotional terms;
determining one or more scoring indexes to score the comment according to a number of useful attributes in the comment based on the one or more emotional terms, the one or more scoring indexes including readability of the comment and a ranking factor of one or more useless attributes in the comments, the readability of the comment determined based on a normalized length of clauses that is calculated based on associated lengths of all of clauses in the comment;
scoring the comment according to the one or more scoring indexes; and
ranking the comment according to a result of the scoring.

17. The apparatus of claim 16, the acts further comprising displaying one or more displaying tags to a user, a respective displaying tag including a normalized useful attribute and a normalized term that describes the target object.

18. The apparatus of claim 16, the acts further comprising:
determining that the one or more scoring indexes include the number of the useful attributes in the comment when the number of useful attributes is larger than or equal to 1; and
determining that the one or more scoring indexes include one or more indexes other than the useful attributes when the number of the useful attributes is 0,
wherein the one or more indexes other than the useful attributes include readability of the comment, a ranking factor of one or more useless attributes in the comments, and a commenting time.

19. One or more computer storage media storing thereon computer-executable instructions executable by one or more processors to perform operations comprising:
extracting one or more terms describing a target object from a comment with respect to the target object;
identifying one or more emotional terms in the one or more terms describing the target from a list of emotional terms maintained at the server;
determining one or more scoring indexes to score the comment according to a number of useful attributes in the comment based on the one or more emotional terms, the one or more scoring indexes including readability of the comment and a ranking factor of one or more useless attributes in the comments, the readability of the comment determined based on a normalized length of clauses that is calculated based on associated lengths of all of clauses in the comment;
scoring the comment according to the one or more scoring indexes; and
ranking the comment according to a result of the scoring.

20. The one or more computer storage media of claim 19, wherein the extracting the one or more terms describing the target object from the comment in connection with the target object comprises conducting a word segmentation of the comment, and wherein identifying one or more emotional terms in the one or more terms describing the target from a list of emotional terms maintained at the server comprises:
finding one or more emotional terms from a result of the word segmentation, a respective emotional term being a term reflecting a view of a user to a respective useful attribute of the target object, a respective useful attribute being information that describes an aspect or a characteristic of the target object, and
identifying the found one or more emotional terms from the list of emotional terms maintained at the server.

* * * * *